3,773,926
OIL DISPERSIBLE PESTICIDES EMPLOYING AN N-VINYL - 2-PYRROLIDINONE-ALKYL METHACRYLATE COPOLYMER DISPERSANT
Edwin C. Knowles, Poughkeepsie, and Frederic C. McCoy, Beacon, N.Y., and Richard D. Watson, Naperville, Ill., assignors to Texaco Inc., New York, N.Y.
No Drawing. Continuation-in-part of application Ser. No. 751,747, Aug. 12, 1968, which is a continuation-in-part of application Ser. No. 158,112, Dec. 8, 1961, both now abandoned. This application Sept. 16, 1970, Ser. No. 72,900
Int. Cl. A01n 9/00, 9/02, 13/00
U.S. Cl. 424—78                        15 Claims

ABSTRACT OF THE DISCLOSURE

Composition and method for the treatment of plants wherein a hydrocarbon insoluble pesticidal material is dispersed in a hydrocarbon mineral oil fraction by a N-vinyl-2-pyrrolidinone-$C_4$–$C_{18}$-alkyl methacrylate copolymer.

---

This application is a continuation-in-part application of application Ser. No. 751,747, filed Aug. 12, 1968, now abandoned, which in turn is a continuation-in-part application of application Ser. No. 158,112, filed Dec. 8, 1961, and now abandoned.

The present invention relates to a method of and composition for the treatment of plants, said compositions containing one or more fungicidal, insecticidal including acaricidal, and pesticidal materials, including mixtures thereof.

It is known that compositions for the treatment of plants containing fungicidal, insecticidal and pesticidal materials in a carrier liquid such as water or in an emulsion of the oil-in-water or water-in-oil type can be used to control various plant diseases and/or attacks by insects and pests thereon. Further, it is known that oil-soluble fungicidal, insecticidal and pesticidal materials in hydrocarbon fractions can be used to treat plants in order to control fungus diseases as well as attacks by insects and pests on the plants. However, these known plant treating compositions possess certain disadvantages which limit their use in modern day spraying practices. For example, the use of water as a carrier liquid for the active material of the treating composition is not desirable because it is an inert component and its volatility and tendency to evaporate during application may result in inefficient coverage of plants. In an attempt to offset these inherent disadvantages, oil-in-water emulsions have been widely used. However, the use of oil-in-water emulsions is also objectionable since the large volumes of water still required materially increase the cost of application, particularly in aerial spraying. Moreover, in semi-tropical and tropical areas where heavy rainfalls are prevalent, use of oil-water emulsions is not satisfactory because the rains remove the active material from the plants. Similarly, in temperate climates, such oil-in-water emulsions are relatively readily removed from the surfaces of the plants by rain.

In accordance with the present invention, it has now been found that compositions for the treatment of plants can be prepared which avoid these disadvantages and, at the same time, surprisingly contribute to more effective control of plant fungus diseases and/or attacks by insects and pests. The plant treatment compositions of the present invention are formed from a hydrocarbon-insoluble pesticidal material component having an average particle size of not greater than about 6 microns, preferably from 0.01 to 2.5 microns, a hydrocarbon mineral oil fraction as the carrier or base liquid and a N-vinyl-2-pyrrolidinone-alkyl methacrylate copolymer dispersant component to disperse the hydrocarbon-insoluble pesticidal material in the hydrocarbon mineral oil fraction. The compositions of the present invention are stable for relatively long periods of time and remain substantially so when diluted with one or more parts by weight of a hydrocarbon fraction having the same general characteristics of the hydrocarbon fraction used to prepare the compositions.

The particle size of the hydrocarbon-insoluble pesticidal material, which term includes a fungicide, insecticide, miticide, acaricide or mixtures thereof and the particular type of copolymer dispersant are critical factors in the effectiveness of these compositions particularly as to their stability properties.

In the so-called concentrated state, that is, as initially prepared, the proportions of the respective components of the compositions are as follows: The hydrocarbon-insoluble pesticidal material, which may be an inorganic or an organic compound or a mixture of inorganic compounds, is generally present in an amount from about 0.1 to about 50 percent by wt. The specific N-vinyl-2-pyrrolidinone-alkyl methacrylate copolymer dispersing agent is employed in an amount of from 1 to 40 percent by weight. The hydrocarbon mineral oil fraction is present in an amount of from about 10 percent to about 98 percent by wt.

The concentrated plant treating composition of the present invention can be diluted with from about 0.5 up to about 20 parts, and preferably 1 to 5 parts by weight, of a hydrocarbon mineral oil fraction having the same general characteristics as the hydrocarbon mineral oil fraction of the pesticidal composition. However, hydrocarbon mineral oil fractions having about the same characteristics as the hydrocarbon fraction in the composition can be employed as the hydrocarbon mineral oil diluent without adversely effecting the activity of the dispersed hydrocarbon-insoluble pesticidal material in the resultant diluted composition.

Hydrocarbon-insoluble pesticidal materials suitable for use in the present invention include inorganic compounds such as for example, copper hydroxide, copper oxide, tribasic copper sulfate, copper arsenite, copper oxychloride-sulfate, calcium arsenate, lead arsenate, sodium fluoride, sulfur and mixtures of such inorganic compounds, organic compounds such as 1-naphthyl-N-methylcarbamate, 3-[3, 5 - dimethyl-2-oxycyclohexyl)-2-hydroxyethyl]glutarimide (also known as cycloheximide); N-trichloromethylmercapto-4-cyclohexene-1,2-dicarboximide; and tetramethylthiuram disulfide, mixtures of such organic compounds as well as mixtures of the inorganic and organic compounds. A particularly preferred group of pesticidal materials are copper hydroxide, copper oxychloride-sulfate, tribasic copper sulfate, 1-naphthyl-N-methylcarbamate, cycloheximide, the dicarboximide, and tetramethylthiuram disulfide. Generally the pesticidal material should not be more than about 1.0 weight percent soluble in the hydrocarbon mineral oil fraction. As used in this specification, "hydrocarbon-insoluble" means having a solubility not greater than about 1.0 percent by weight in a hydrocarbon mineral oil fraction showing the characteristics set forth for oil A in Table I below at temperatures in the range of 70–80° F.

The term "pesticidal material" as used in the specification and claims covers a fungicidal, insecticidal, acaricidal or miticidal material or mixtures thereof used in agricultural practice to kill or control fungus diseases and/or attacks by insects and pests on plants.

The hydrocarbon-insoluble pesticidal material of the compositions of the present invention has an average particle size of about 0.01 to 6 microns or less, preferably an average particle size of about 0.01 to 2.5 microns. In the case of the use of an inorganic compound such as copper hydroxide, the copper hydroxide particles should have a particle size of less than 1 micron, preferably 0.01 to 0.8 micron. Such finely divided copper hydroxide particles can be prepared by the method disclosed in U.S. Pat. 2,738,283 and Re. U.S. Pat. 24,324.

By the term "hydrocarbon mineral oil fraction" is meant those hydrocarbon mineral oil fractions normally used in conventional agricultural applications. Broadly, these hydrocarbon fractions may encompass the boiling range from kerosene through heavy lubricating oil cuts, and mixtures thereof, suitably with an initial boiling point temperature of about 320° F. and an end boiling point temperature of about 900° F. A particularly preferred fraction is a refined cut of a paraffin base oil of 30 to 100 viscosity, SUS at 100° F., and having a boiling point range of 450 to 900° F. and an aromatics content below about 10%.

For particular applications it is desirable that such fractions have an aromatics content below about 20% by weight, preferably less than about 10 to 15%.

In applying pesticidal materials to growing banana plants for example, it is particularly desirable to employ hydrocarbon mineral oils having a boiling point range between about 600 and 750° F., an aromatics content below 15% by weight and a viscosity at 100° F. of between about 75 to 100 SUS.

Table I below presents representative characteristics of hydrocarbon mineral oil fractions which can be used in preparing the compositions of the present invention.

TABLE I

|  | Mineral oil | | | | | |
|---|---|---|---|---|---|---|
|  | A | B | C | D | E | F |
| Gravity, °API | 37.0 | 20.4 | 27–29 | 31.9 | 30.9 | 31.8 |
| Flash point, Cleve. open cup, ° F | 270 | 370 | 490 | 350 | 355 | 355 |
| Fire point, Cleve. open cup, ° F | 290 | 420 | 550 | | 395 | |
| Pour point, ° F | +20 | −35 | +10 | +20 | +20 | +15 |
| Viscosity SUS at 100° F | 41.2 | 310 | 1,196.3 | 73.5 | 86.9 | 85.0 |
| Boiling point range, ° V | 508–650 | | | 615–740 | 617–853 | 630–752 |
| Unsulfonatable residue, percent | 94.0 | | | 92 | 90 | 93 |

Oil A is obtained from a paraffin base crude oil which has been acid and clay treated, water washed, doctor treated and clay treated.

Oil B is obtained from a naphthene base crude which has been moderately acid treated, neutralized, steamed and brightened.

Oil C is a blend of 16.8% by volume of an oil obtained from a wax distillate fraction of a paraffin base crude which has been furfural refined, light acid treated, clay contacted and solvent dewaxed, and 83.2% by volume of an oil obtained from the residuum of a paraffin base crude after propane deasphalting, furfural refining, solvent dewaxing and clay filtering.

Oil D is obtained from a treated pressed distillate of a paraffin base crude after fractionation, heavy acid treatment, neutralization, steaming and brightening.

Oil E is a blend of 75 percent of an oil similar to oil D above without the heavy acid treating step and 25 percent of an oil similar to the oil used as the first named component of oil C above after a further clay percolation step.

Oil F is obtained in a manner similar to oil E.

The dispersing component of the compositions of the present invention is a N-vinyl-2-pyrrolidinone-alkyl methacrylate copolymer having an average molecular weight of from about 300,00 to about 1,000,000 prepared from a mixture of monomers comprising from about 4 to 15% N-vinyl-2-pyrrolidinone, 85 to 96% of an alkyl methacrylate or a mixture of alkyl methacrylates by weight. The alkyl group of the alkyl methacrylate can contain from about 4 to about 18 carbon atoms, such as the butyl, isopentyl, 2-ethyl-hexyl, decyl, lauryl, myristyl, stearyl and octadecyl groups, including mixtures thereof. A representative copolymer is prepared from a mixture of monomers comprising 6 to 10% of N-vinyl-2-pyrrolidinone, 25 to 35% of stearyl methacrylate, 45 to 55% of lauryl methacrylate and 10 to 14% of butyl methacrylate, on a weight basis. The monomers used to prepare a preferred copolymer comprise 8% N-vinyl-2-pyrrolidinone, 30% stearyl methacrylate, 50% lauryl methacrylate and 12% butyl methacrylate, by weight. Such copolymers effectively disperse the hydrocarbon-insoluble pesticidal material of the composition of this invention in the hydrocarbon mineral oil fraction and maintain the pesticidal material substantially so dispersed for relatively long periods of time.

In addition, this particular type of N-vinyl-2-pyrrolidinone-alkyl methacrylate copolymer is unique in that it further acts as a coupling or sticking agent whereby the pesticidal material of the composition is held in relatively close contact with the exposed surface of the plant. This surprising feature contributes to the efficacy of the compositions of the present invention as it materially reduces the frequency of application of the composition to the plants. Moreover, by functioning in the compositions of the present invention in a dual capacity, namely, as the dispersing agent for the pesticidal material and as the stickiness agent, one can thereby achieve excellent control of plant fungus diseases and attack by insects and pests on growing plants. This is due to the ability of the copolymeric material to distribute the pesticidal material substantially throughout the hydrocarbon mineral oil fraction whereby, when the composition is applied to the plant, the pesticidal material or a portion thereof is distributed substantially uniformly about and on the plants being sprayed. Moreover, when in contact with the plants being treated, the composition is designed to kill and/or control the particular fungus disease and/or kill and/or control the attacks by insects and pests on the plant. For example, the fungicidal material of the composition would kill or inhibit the fungus while the N-vinyl-2-pyrrolidinone-alkyl methacrylate copolymer would act to maintain the fungicide in close and intimate contact with the plant foliage. The hydrocarbon mineral oil fraction would spread the fungicide and dispersant about the plant foliage to inhibit the further development of the fungus disease in the plant.

Thus, it is seen that all the components of the composition of the present invention contribute to the sought after goal, namely, killing and/or preventing the spread of fungus disease on the plants and/or killing or controlling the attacks by the insects and/or pests.

For application from aircraft it has been found that the compositions of the present invention are efficiently employed when diluted with from 3 to 5 parts of hydrocarbon mineral oil fraction when using about a 30% concentration of the pesticidal material in the hydrogen mineral oil concentrate. In aerial spraying operations, the diluted compositions can be applied at the rate of from about 2 up to about 5 gallons per acre although application rates of from about 0.5 up to about 8 to 10 gallons per acre can be used with satisfactory results.

It is preferred that the compositions of the present invention also contain a supplementary dispersing agent consisting of finely divided particles of a pyrogenic silicon dioxide prepared by flame hydrolysis. The silicon dioxide particles have an average particle diameter in the range of from about 100 to 400 angstroms. A pyrogenic silicon dioxide known by the trade name Cab-O-Sil has been found to be particularly effective in the compositions of this invention. This ultrafine silicon dioxide has an average particle diameter in the range of from 150 to 250 angstroms and a surface area of about 175 to 200 square meters per gram. The pyrogenic silicon dioxide can be used in minor amounts in the compositions of the present invention such as from about 0.1 up to about 4 percent by weight, based on the weight of the composition. Excellent results can be obtained using amounts of a pyrogenic silicon dioxide in the range of from about 0.75 to 2.5 percent by weight, based on the weight of the composition.

These finely divided pyrogenic silicon dioxide particles appear to function in the compositions of this invention as supplementary dispersing agents whereby the hydrocarbon-insoluble pesticidal material is maintained in the hydrocarbon mineral oil fraction in the dispersed phase for a relatively long period of time. In addition, these finely divided silicon dioxide particles appear to keep in the relatively soft state any sediment formed on permitting the composition to stand for a considerable length of time so that simple mixing or agitation of the composition will redistribute the sediment in the hydrocarbon fraction.

The compositions of the present invention can be prepared in the following manner. An admixture of a pesticidal material, for example, finely divided copper hydroxide, 8% N-vinyl-2-pyrrolidinone, 92% alkyl methacrylate copolymer dispersing agent known by the trade name Acryloid 917, average M.W. about 550,000, and a hydrocarbon mineral oil fraction such as an oil fraction of the type designated in Table I above as mineral oil A, is formed and intimately mixed in a suitable mixing vessel equipped with a stirring device. The stirring operation admixes the respective components and there is obtained a uniformly dispersed fluid admixture of the copper hydroxide particles in the hydrocarbon mineral oil. If desired, the respective components can first be mixed in a suitable vessel and then passed through a colloid mill.

Where desirable or necessary the pesticidal material can be dissolved, for example, in a solvent therefor, such as alcohol or an organic solvent also insoluble in the hydrocarbon mineral oil and the resulting solution may then be dispersed in the hydrocarbon mineral oil by means of the N-vinyl-2-pyrrolidinone-alkyl methacrylate copolymer dispersing agent referred to hereinabove. The solvent also remains dispersed in the oil.

Following is a description by way of example of methods of carrying out the practice of the present invention.

EXAMPLES 1–8

Table II shows the results of a series of compositions containing varying amounts of a pesticidal material, a hydrocarbon mineral oil and a number of dispersing agents. This table also demonstrates the effectiveness of the N-vinyl-2-pyrroluidinone-alkyl methacrylate copolymer dispersant, average M.W. of about 550,000, in comparison with other types of known dispersing agents. In addition, the table shows the appearance of the respective compositions after standing for 24 hours and further reports the results of inspections on the compositions after dilution with 5 parts of the same diluent oil.

TABLE II

| Composition (wt. percent) | Examples | | | | | | | |
|---|---|---|---|---|---|---|---|---|
| | 1 | 2 | 3 | 4 | 5 | 6 | 7 | 8 |
| Hydrocarbon mineral oil A | 40 | 40 | 65 | 60 | 50 | 68 | 65 | 60. |
| Copper hydroxide | 30 | 30 | 30 | 30 | 30 | 30 | 30 | 30. |
| Copolymer of N-vinyl-2-pyrrolidinone and alkyl methacrylate.[1] | 30 | | | | | | | |
| Copolymer of alkyl methacrylates [2] | | 30 | | | | | | |
| $CO_2$ neutralized basic barium sulfonate | | | 5 | 10 | 20 | | | |
| Lecithin | | | | | | 2 | 5 | 10. |
| Appearance (after standing 24 hours) | Uniform liquid. | Solid gel | Fluid | Fluid | Fluid | Fluid | Fluid | Fluid. |
| Degree of separation | None | do | Medium | Medium | Medium | Medium | Medium | Medium. |
| Amount of sediment | do | do | Heavy | Heavy | do | do | Light-medium. | Light-Medium. |
| Composition of above examples diluted with 5 parts of same diluent oil after standing 24 hours. | | | | | | | | |
| Amount of sediment | Light | Medium | Medium | Medium | do | do | Medium | Medium. |

[1] 8% N-vinyl-2-pyrrolidinone–92% alkyl methacrylate copolymer (Acryloid 917).
[2] Mixture of polymers of 19% Bu methacrylate, 33% stearyl methacrylate and the remaining 48% is a mixture of decyl, octyl and lauryl methacrylates.

The data in the above Table II show that an oil-insoluble pesticidal material can be effectively dispersed in a hydrocarbon mineral oil when N-vinyl-2-pyrrolidinone-alkyl methacrylate copolymer dispersing agent is used in the compositions of the present invention.

In particular, it is to be noted that the concentrate of Example 1 after standing for 24 hours was a uniform liquid with no evidence of any degree of separation or sediment therein, whereas the remaining examples all contained from medium to heavy amounts of sediment and in addition exhibited signs of separation. The appearance of the composition of Example 2 and the degree of separation as well as the amount of sediment found in the compositions of Examples 3–8, inclusive, demonstrate that known mineral oil-soluble dispersing agents such as the mixture of alkyl methacrylate polymers, a carbon dioxide neutralized basic barium sulfonate and lecithin are not satisfactory dispersing materials for use in dispersing copper hydroxide in mineral oils. Further the diluted sample of Example 1 after standing for 24 hours only developed a light amount of sediment whereas the oil diluted compositions of Examples 2–8, inclusive, developed much more sediment.

As further evidence of the specificity of the particular dispersing agent employed in applicants' compositions to effectively disperse other pesticidal materials which are hydrocarbon insoluble the following Table III is presented.

TABLE III

| | Examples | | | |
|---|---|---|---|---|
| Composition, (wt. percent) | 9 | 10 | 11 | 12 |
| Hydrocarbon mineral oil A | 50 | 60 | 60 | 60 |
| Copolymer of N-vinyl-2-pyrrolidinone-alkyl methacrylate [a] | 20 | 20 | 20 | 20 |
| Copper hydroxide | 30 | | | |
| Microgel [b] | | 20 | | |
| Tribasic copper sulfate [c] | | | 20 | |
| COCS [d] | | | | 20 |
| Mixing procedure | Waring Blendor | | | |
| Analysis of sample: | | | | |
| Percent copper | 17.4 | 10.5 | 10.7 | 11.0 |
| Percent sulfur | | | | |
| Analysis after storage [f]: | | | | |
| Days stored at room temperature | 134 | 8 | 8 | 8 |
| Percent copper | 16.9 | 2.8 | 2.3 | 5.9 |
| Percent sulfur | | | | |

[a] Copolymer prepared from a mixture of monomers comprising 8% N-vinyl-2-pyrrolidinone–92% alkyl methacrylate (12% butyl-, 30% stearyl, 50% lauryl-methacrylates) (Acryloid 917).
[b] Micronized tribasic copper sulfate (50% copper).
[c] Tribasic copper sulfate $CuSO_4 \cdot 3\ Cu(OH)_2 \cdot H_2O$ (0.1–1 microns).
[d] Copper oxychloride sulfate.
[e] Based on analysis of active ingredient.
[f] Sample for analysis from middle of container.

The data set forth in the above table show that N-vinyl-2-pyrrolidinone-alkyl methacrylate copolymer is effective in dispersing hydrocarbon-insoluble pesticidal materials in hydrocarbon mineral oil fractions. In addition, the data presented for the hydrocarbon mineral oil dispersion of Example 9 demonstrates that the resultant composition is extremely effective, as it retained almost all of the pesticidal material intimately dispersed in the hydrocarbon mineral oil after standing for a period in excess of 4 months.

Moreover, it is to be seen that the use of N-vinyl-2-pyrrolidinone-alkyl methacrylate copolymer dispersant is effective to disperse other hydrocarbon insoluble pesticidal materials in a hydrocarbon mineral oil. Further, this dispersing effect is maintained for a considerable period of time since from 13 to 50 percent or more of the hydrocarbon-insoluble pesticidal materials of Examples 9–12, inclusive, as determined by chemical analysis, remain dispersed in the hydrocarbon mineral oil for more than 7 days.

In the absence of the N-vinyl-2-pyrrolidinone-alkyl methacrylate copolymer, attempts to disperse the pesticidal materials in Table III in the same hydrocarbon fraction were unsuccessful, since stable dispersions were not formed.

Following is a description by way of further examples of additional methods of carrying out the present invention.

EXAMPLE 13

A fungicidal material, 3 - [2 - (3,5-dimethyl-2-oxycyclohexyl) - 2 - hydroxyethyl]glutarimide, in an amount of 1 part by weight was dissolved in 6 parts of dimethyl acetone dicarboxylate. The resulting solution was then dispersed in 200 parts by weight of hydrocarbon mineral oil C containing 0.5 percent by weight of the N-vinyl-2-pyrrolidinone-alkyl methacrylate copolymer of Example 9 as the dispersing agent. The resulting dispersion was stable.

EXAMPLE 14

There was intimately mixed for 3 minutes in a Waring Blendor 80 weight parts of mineral oil A and 20 weight parts of an insecticide comprising 1-naphthyl-N-methylcarbamate having a particle size of 0.05 to 6 microns, most of the particles being about 0.05 micron. A sample of the blend showed marked oil separation within 8 hours. After 3 days the oil separation amounted to about 6% of total volume of the sample. After 21 days, the oil separation amounted to 20% of total sample volume.

EXAMPLE 15

Following the procedure of Example 14 above, 60 parts of mineral oil A, 20 parts of the same insecticide and 20 parts of the copolymer of Example 9 were intimately mixed in a Waring Blendor for 3 minutes. A sample of this blend after standing for 3 days showed no clear oil separation. After a 21-day period an oil separation of only about 3% of the total volume of the blend was observed. A representative sample from the middle portion showed a solids content of 20% after standing for 21 days.

Examples 14 and 15 illustrate the necessity to employ the N-vinyl-2-pyrrolidinone-alkyl methacrylate copolymer dispersant of the invention for the preparation of stable dispersions of hydrocarbon insoluble pesticidal materials in a hydrocarbon mineral oil fraction.

EXAMPLE 16

An intimate blend of 15% of finely divided copper hydroxide in 85% hydrocarbon mineral oil A was prepared. One part by volume of the blend was then diluted with 5 volumes of mineral oil A and the diluted blend was shaken thoroughly. The copper hydroxide particles began to settle to the bottom of the container substantially immediately after standing and, after 1 hour, a clear oil layer amounting to 30% of the container was evident. This example illustrates that in the absence of the N-vinyl-2-pyrrolidinone-alkyl methacrylate copolymer dispersing component of the invention, satisfactory dispersions of a hydrocarbon insoluble pesticidal material such as copper hydroxide cannot be prepared.

EXAMPLE 17

A non-homogeneous blend of 20 parts microgel (micronized tribasic copper sulfate, 50% copper) and 80 parts of mineral oil A was prepared by mixing the ingredients for 3 minutes in a Waring Blendor. Within 30 minutes of standing in a container, there was evidence of clear oil separation, which increased on further standing.

EXAMPLE 18

There was intimately mixed in a Waring Blendor, 40 parts of hydrocarbon mineral oil A, 5 parts of 1-naphthyl-N-methylcarbamate, 25 parts of copper hydroxide in the form of finely divided particles, and 30 parts of the N-vinyl-2-pyrrolidinone-alkyl methacrylate copolymer of Example 9.

After standing for 49 days, there was evidence of a separated oil layer in the blend only amounting to about 3% by volume. The remaining 97% by volume was homogeneous with no evidence of any sediment formation on the bottom of the container.

EXAMPLE 19

The N-vinyl-2-pyrrolidinone-alkyl methacrylate copolymer of Example 9 in an amount of 150 pounds and 100 pounds of hydrocarbon mineral oil A were charged to a jacketed kettle equipped with a stirring device and a scraper. The stirring and scraping devices were engaged and there was added to the kettle in 10 pound increments a total of 150 pounds of finely divided copper hydroxide. During the addition of the copper hydroxide, the mixture was circulated through a positive displacement pump and returned to the kettle. After thorough mixing, the resultant blend was passed through a homogenizer, recirculation being continued. In all, about 2 passes were made through the homogenizer. During the entire mixing operation, the temperature of the blend was controlled at 90–120° F. An additional 100 pounds of mineral oil A was added and recirculation, stirring and homogenization continued for 20 minutes. The blend was withdrawn through the homogenizer as a viscous, readily pourable oil. On cooling to ambient temperature the blend became more viscous but was flowable.

EXAMPLE 20

The composition of Example 9 was diluted on a 1:1 basis, by volume, with hydrocarbon mineral oil A. The diluted composition was applied to a selected plot of growing banana plants by helicopter using a spray rate of about 2 gallons per acre. Additional applications were made to the resulting treated plot on a frequency of about 14-day intervals employing the composition of Example 9 after it had been diluted with 3 parts by volume of hydrocarbon mineral oil A.

The treated plants were examined periodically during the spraying and also at the end of the three months' test period. There was no evidence of any phytotoxic effect on the plants. The normal rate of fungus infection and/or disease on the sprayed plants was lessened. No difficulties were encountered in separation or settling of the components of the diluted composition during the applications. The spray lines and nozzles were substantially free from sediment.

Of particular significance was the excellent distribution and adhesion of the fungicide to the exposed leaf surfaces of the plants.

EXAMPLE 21

A fungicidal composition consisting of 88.5 parts of hydrocarbon mineral oil A, 6 parts of the dispersant of Example 9, 6 parts of finely divided copper hydroxide and 0.5 part of ultrafine particles of silicon dioxide having an average particle size between about 150 and 250 angstroms (Cab-O-Sil), all parts by weight, was prepared using a Waring Blendor as the mixing device. The copper hydroxide was dispersed in the oil. After standing for 24 hours the concentrate showed some sediment at the bottom of the container. The sediment on examination gave an appearance of a soft gel which was readily redispersed on additional stirring.

Another sample of the concentrate after dilution with 5 parts by volume of the same mineral oil used in the concentrate was permitted to stand for a 24-hour period. Examination of this sample showed that very little sediment had formed during the standing period.

This example demonstrates that the incorporation of a minor amount of a finely divided pyrogenic silicon dioxide is effective as a supplementary dispersing agent for the compositions of this invention.

EXAMPLE 22

Following the procedure of Example 21, 30 parts of copper hydroxide were dispersed in 38 parts of hydrocarbon mineral oil A containing 30 parts of the N-vinyl-2-pyrrolidinone-alkyl methacrylate copolymer dispersant of Example 9 and 2 parts, on a weight basis, of ultrafine pyrogenic silicon dioxide particles (150–250 angstroms average). The resulting dispersion, after being diluted with 5 volumes of mineral oil A was permitted to stand for 56 days. Inspections at the end of 1 day, 3 days and after 56 days, showed no putty-like sediment in the container.

EXAMPLE 22A

Example 21 was repeated, employing 2 parts of another pyrogenic oxide, an aluminum oxide sold under the trade name Alon C having an average particle size of 100 to 400 angstroms instead of silicon dioxide. The diluted sample was inspected at the end of 1, 13 and 56 day periods. After 1 day a small amount of putty-like residue was observed; after 13 and 56 days, a 3/16 of an inch layer of a hard, putty-like residue which was difficult to disperse was observed on each occasion.

EXAMPLE 23

Results similar to those obtained using pyrogenic alumium oxide were also obtained when Example 21 was repeated using a non-pyrogenic silicon dioxide, namely, a hydrated silica, sold under the trade name Hi-Sil having an average particle size of 300 angstroms.

This example illustrates the unique effect of ultrafine pyrogenic silicon dioxide in the composition of this invention in preventing the formation of a putty-like residue on dilution of the concentrate.

Obviously, many modifications and variations of the invention, as hereinbefore set forth, may be made without departing from the spirit and scope thereof, and therefore, only such limitations should be imposed as are indicated in the appended claims.

We claim:

1. A composition for the treatment of plants comprising an effective amount of from about 0.1 to 50% by weight of a hydrocarbon mineral oil insoluble material having an average particle size of about 0.01 to 6 microns in diameter, said oil insoluble material being a pesticide and being selected from the group consisting of (a) an inorganic compound selected from the group consisting of copper hydroxide, tribasic copper sulfate and copper oxychloridesulfate, (b) an organic compound selected from the group consisting of tetramethylthiuram disulfide, 1-naphthyl-N-methylcarbamate, 3-[2-(3,5-dimethyl-2-oxycyclohexyl)-2-hydroxyethyl]glutarimide and N-trichloromethylmercapto-4-cyclohexane-1,2-dicarboximide and (c) mixtures of said copper hydroxide and 1-naphthyl-N-methylcarbamate, about 1 to 40% by weight of a N-vinyl-2-pyrrolidinone-alkyl methacrylate copolymer dispersant material, said copolymer having an average molecular weight of from about 300,000 to about 1,000,000 said copolymer being prepared from a mixture of monomers comprising 4–15% of N-vinyl-2-pyrrolidinone and 85–96% of alkyl methacrylate wherein the alkyl group contains 4 to 18 carbon atoms, and 10 to 98% by weight of a hydrocarbon mineral oil fraction in the kerosene to heavy lubricating oil boiling range having an aromatics content below about 20% by weight, including mixtures, said hydrocarbon mineral oil fraction having an initial boiling point temperature of about 320° F. and an end boiling point temperature of about 900° F., said copolymer being effective to disperse and maintain the said oil insoluble material in suspension in said hydrocarbon mineral oil fraction.

2. The composition as claimed in claim 1 containing from 0.1 to 4% by weight of finely divided pyrogenic silicon dioxide.

3. The composition as claimed in claim 2 containing from about 0.75 to about 2.5% by weight of finely-divided silicon dioxide, based on the weight of the composition.

4. The composition as claimed in claim 1 wherein the oil insoluble material has an average particle size of from about 0.01 to 2.5 microns.

5. The composition as claimed in claim 1 wherein the oil insoluble material is copper hydroxide.

6. The composition as claimed in claim 1 wherein the oil insoluble material is 1-naphthyl-N-methylcarbamate.

7. The composition as claimed in claim 1 wherein the oil insoluble material is copper oxychloride sulfate.

8. The composition as claimed in claim 1 wherein the oil insoluble material is 3-[2-(3,5-dimethyl-2-oxycyclohexyl)-2-hydroxyethyl] glutarimide.

9. The composition as claimed in claim 1 wherein the oil insoluble material is a mixture of finely divided copper hydroxide and 1-naphthyl-N-methylcarbamate.

10. The composition as claimed in claim 1 wherein the hydrocarbon mineral oil fraction is a lubricating oil fraction having a boiling point temperature range at atmospheric pressure of 475 to 675° F. and a flash point above 260° F. and an unsulfonatable residue of at least 85% by weight.

11. The composition as claimed in claim 10 wherein the lubricating oil fraction has an unsulfonatable residue of at least 90 percent.

12. The composition as claimed in claim 1 wherein the dispersant is prepared from a mixture of monomers comprising 6 to 10% N-vinyl-2-pyrrolidinone, 25 to 35% stearyl methacrylate, 45 to 55% lauryl methacrylate and 10 to 14 percent butyl methacrylate, on a weight basis.

13. The composition as claimed in claim 1 wherein the copolymer dispersant is prepared from a mixture of monomers comprising about 8% N-vinyl-2-pyrrolidinone, about 30% stearyl methacrylate, about 50% lauryl methacrylate and about 12% butyl methacrylate, on a weight basis.

14. The composition as claimed in claim 1 additionally containing from 1 to 5 parts by volume of said hydrocarbon mineral oil fraction as a diluent oil.

15. A method of protecting a plant against attack by pests selected from the group consisting of fungi, insects, acarids, and mites which comprises spraying said plant with an effective amount of the composition of claim 1.

References Cited

UNITED STATES PATENTS 3,131,119   4/1964   Fordyce et al. _____ 424—295

OTHER REFERENCES

Hanna, "Handbook of Agricultural Chemicals," 2nd ed. (1958), pp. 160, 170, 182, 329.

ALBERT T. MEYERS, Primary Examiner

V. D. TURNER, Assistant Examiner

U.S. Cl. X.R.

424—141, 268, 274, 300, 328

PO-1050
(5/69)

UNITED STATES PATENT OFFICE
CERTIFICATE OF CORRECTION

Patent No. 3,773,926               Dated   11-20-73

Inventor(s) E.C. Knowles, F.C. McCoy & R.D. Watson

It is certified that error appears in the above-identified patent and that said Letters Patent are hereby corrected as shown below:

Col. 2, line 47      "3-[3,5-dimethyl" should be --3-[2-(3,5-dimethyl

Col. 4, lines       "apaplication" should be --application--
       65-66

Col. 5, line 74      " pyrroluidinone" should be --pyrrolidinone--

Signed and sealed this 16th day of July 1974.

(SEAL)
Attest:

McCOY M. GIBSON, JR.                    C. MARSHALL DANN
Attesting Officer                        Commissioner of Patents